June 2, 1953 H. B. GREENING 2,640,350
MEANS FOR TESTING THE ACCURACY OF WATCHES
Filed May 18, 1946 2 Sheets-Sheet 1

Inventor.
H. B. Greening
by
H. J. S. Dennison
Atty

June 2, 1953  H. B. GREENING  2,640,350
MEANS FOR TESTING THE ACCURACY OF WATCHES
Filed May 18, 1946  2 Sheets-Sheet 2
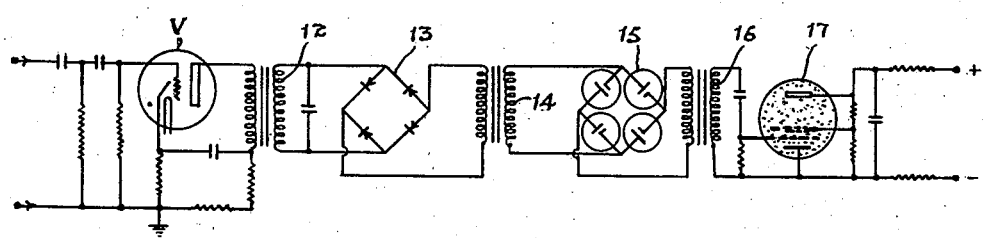
Fig. 4.
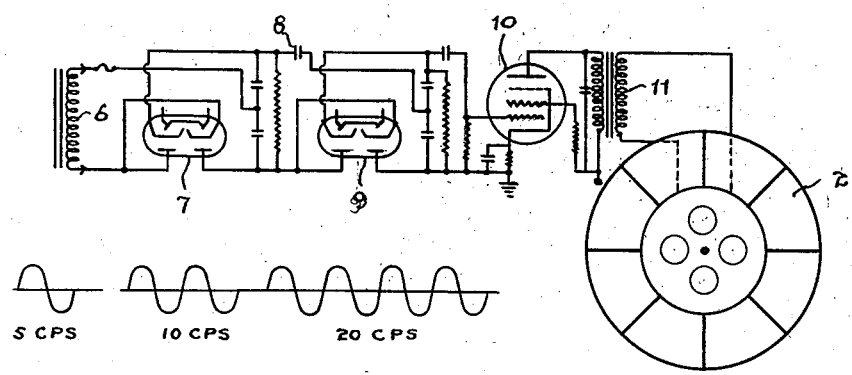
Fig. 3.
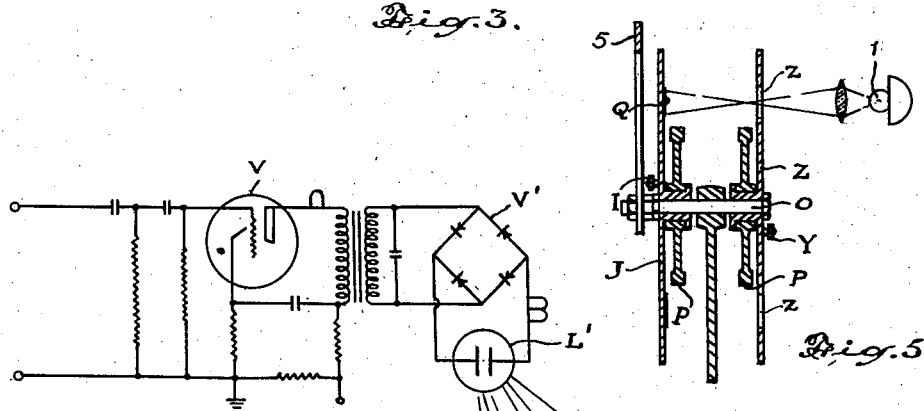
Fig. 2.
Fig. 5.
Inventor:
H. B. Greening
by
H. J. S. Dennison
atty.

Patented June 2, 1953

2,640,350

UNITED STATES PATENT OFFICE 2,640,350

MEANS FOR TESTING THE ACCURACY OF WATCHES

Herald B. Greening, Hamilton, Ontario, Canada

Application May 18, 1946, Serial No. 670,805

3 Claims. (Cl. 73—6)

This invention relates to improvements in devices for testing the accuracy of watches and the principal object of the invention is to provide a device which will present a practically instantaneous visual indication of the degree of inaccuracy present in the watch being tested in comparison with a watch which is known to keep accurate time.

A further object is to provide an instrument of compact form which may be produced at a reasonable cost so that it may be available to the average watch maker.

The principal features of the invention consist in utilizing the sound waves produced by the tick of a standard or accurately running watch transformed into electrical impulses, such impulses being amplified to effect the operation of a rotatable disc, the surface of which is divided by radial markings, and in utilizing the sound waves produced by the tick of a watch to be tested transformed into electrical impulses electronically amplified and producing light flashes to periodically illuminate said marked dial to produce a stroboscopic effect and to determine the magnitude of the movement of the tested watch whether fast or slow.

A further important feature consists in the novel manner of controlling the magnetism effecting the operation of the rotatable radially marked disc.

In the accompanying drawings:

Figure 2 is a diagrammatic view illustrating a manner of electronically flashing a light to illuminate the graduated dial in accordance with the impulses generated by the amplified impulses emanating from the watch to be tested.

Figure 3 is a diagrammatic view illustrating the electronic means for multiplying the number of impulses emanating from the watch to be tested to produce a greater frequency of flashes to illuminate the radially marked disc operated by the "standard" watch.

Figure 4 is a diagrammatic view of a modified arrangement of electronic multiplication of flashes.

Figure 5 is a vertical sectional detail of the stroboscopic disc assembly.

Figure 1:
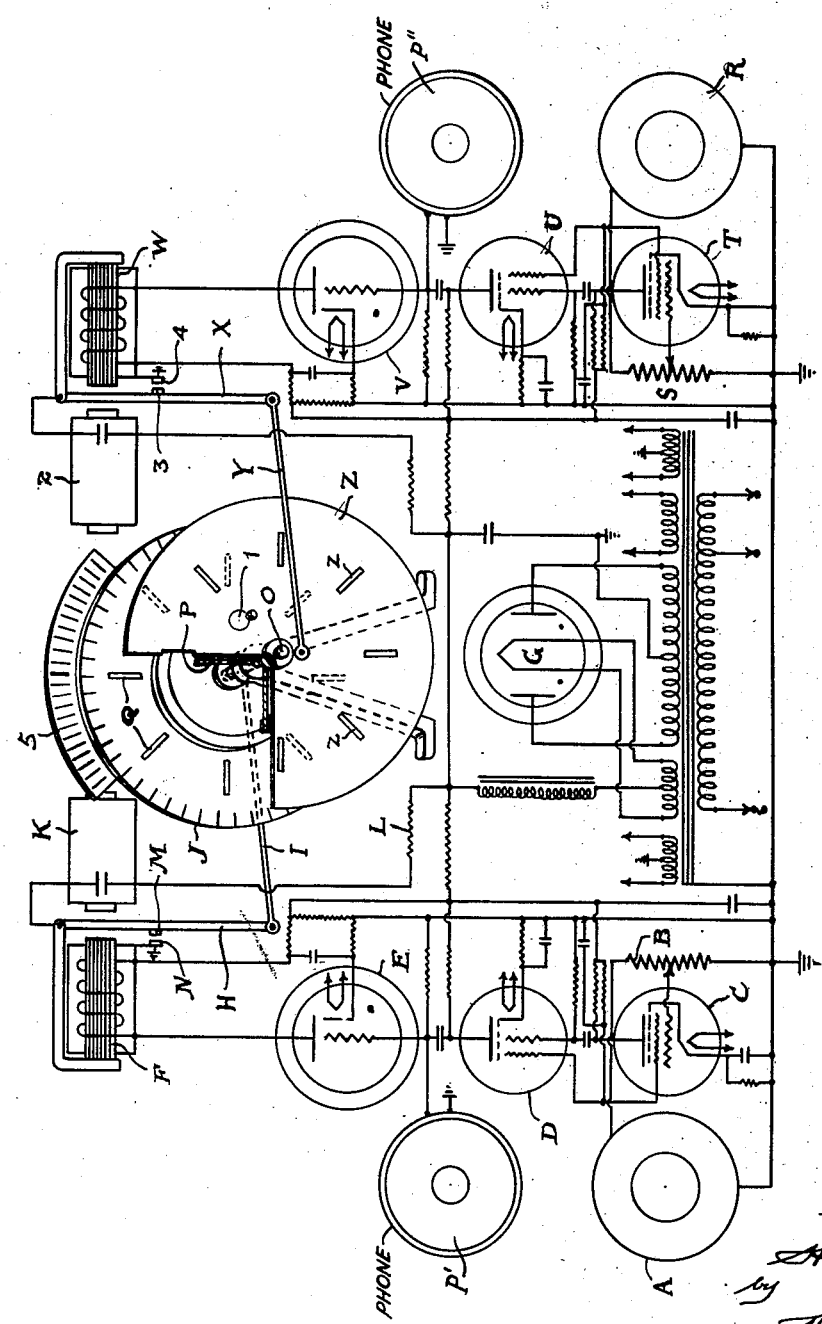
Figure 1 is a diagrammatic view showing the preferred arrangement of apparatus for carrying this invention into effect.

In the schematic diagram illustrated in Figure 1 a suitable type of microphone A is electrically connected through a variable resistance B to a first stage amplifying tube C. The output from the first stage amplifier is taken to the grid of the second stage amplifying tube D.

Two stages of amplification are shown but it will be understood that any desirable number of stages of amplification may be connected in cascade to provide the desirable output amplitude.

The output of the cascaded amplifiers is fed to the grid of the tube E. The tube E is biased sufficiently by the cathode circuit to prevent conduction until the amplified pulse is applied to the grid.

The output from the tube E is then conducted to the coil F. The necessary voltages for operating the tubes described are supplied by the diagrammatically illustrated circuit G which is not required to be described in detail as the arrangement is in accordance with common practice.

Mounted on the frame of the magnet F is a pivotal armature H which is operatively connected through a connecting rod I to a disc J rotatably mounted on suitable bearings.

The operation of the armature H is controlled by the magnetism created by the pulsating flow of current controlled by the tube E.

A magnet K is arranged in opposed relation to magnet F on the opposite side of the armature H. This coil is connected with the filtered D. C. supply through a suitable limiting resistance L and is connected to the armature H which armature carries a contact M, which contact is adapted to engage a fixed contact N which completes the circuit to ground, thus causing current to flow through the coil K and to attract the armature in the direction opposite to that effected by the magnet F, overcoming any residual magnetism in the magnet F and ensuring smooth operation of the armature and its driven disc.

The disc J is mounted on a fixed spindle O and on this disc is mounted a loose inertia member which is preferably in the form of a loose fly wheel P. This arrangement of a loose inertia member is very important as it irons out inequalities in the impulses applied thereto and ensures a smooth, uniform rotation of the disc.

The surface of this disc J is divided by a plurality of equally spaced radial markings, here shown as eight in number, as indicated by the letter Q. These markings are preferably white on a black ground so that they will be quickly perceptible to the eye if illuminated by flash illumination. This disc may be transparent and the markings obtuse.

A microphone R is arranged to receive and support a watch to be tested and the electrical impulses from this microphone are conducted through the variable resistance S to the grid of the amplifier tube T.

The output of the first stage amplifier T is directed to the grid of the second stage amplifying tube U and the output from the second stage of amplification or any further stage which may be desired is applied to the grid of the tube V which corresponds to the tube E. This tube controls the current flow to a magnet W similar to the magnet F which operates an armature X and a connecting rod Y, which is connected to a disc Z rotatably mounted co-axial with the disc J and associated with disc Z is a second loose inertia member P.

The disc Z is provided with a plurality of radial slots z which correspond in number to the radial markings Q on the disc J.

A lamp 1, provided with a suitable reflector and lens, is aranged to project a beam of light against the disc Z to throw said beam to strike the surface of the disc J. This lamp is preferably energized by a direct current so that there will be no fluctuation of the beam of light projected through the slots z of the disc Z, which is preferably rotated in the opposite direction to the direction of rotation of the disc J.

It will be understood of course that the armature X is operated in a precisely similar manner to the operation of the armature H, and a magnet 2 corresponding to the magnet K is arranged opposite to the magnet W and the periodic flow of current therethrough is governed by the contacts 3 and 4. If desired suitable test earphones P' and P'' may be provided to check the output of the amplifiers D and U respectively.

It will be understood that with an apparatus such as described the two watches, one operating accurately as the "Standard Time" measuring device, and the other to be tested, are placed on the microphones A and R, and the ticks of these two watches through the amplifying devices described, drive the two impulse motors, represented by the magnets and their moving armatures.

One of these motors drives the radially marked disc while the other drives the radially slotted disc, and as the slots in the rotating disc pass the beam of light from the lamp the radially marked disc is illuminated.

A watch ticks at the rate of three hundred impulses per minute and if the slotted disc is provided with eight slots there will be twenty-four hundred flashes per minute to illuminate the radially marked disc, and as there are eight radial markings on the second and illuminated disc, these markings with the illuminations produce a stroboscopic effect.

A suitable scale 5 is arranged in a stationary position relative to the disc J with a zero mark centrally thereof and the effect produced by the illumination of the radially lined disc is that, if the watch being tested is slow or operating at less than three hundred ticks per minute, the white lines of the disc will appear to move slowly in one direction of rotation and should the test watch be fast and operating at more than three hundred ticks per minute the white lines on the disc J will apparently move slowly in the other direction of rotation.

It will be understood that as the speed of the disc J is exactly three hundred times as fast as the second hand of the watch, the indication of movement either right or left of the zero marking on the scale will show instantly whether the watch is running slow or fast, and by permitting the test to continue for a period of say, one-half minute, by checking the number of graduations, the white line gains or losses either side of the zero point on the scale will indicate how many minutes per month the watch being tested is in error.

It will be readily understood that the object of this invention may be accomplished by creating light flashes regulated by the ticking of the watch to be tested by some means other than the movement of a rotating slotted disc.

The diagram in Figure 2 illustrates one manner of accomplishing the periodic flashing of a light to illuminate the rotating radially marked disc. In this form the amplified electrical impulses from the cascaded amplification is applied to the grid of the tube V as previously stated.

The pulse output from the tube V is transformer coupled to a bridge rectifier circuit V'. The secondary of the coupling transformer is tuned to provide an output wave which results in the multiplication of impulses applied to the illuminating lamp L' which will flash to illuminate the rotating radially marked disc in lieu of the illumination governed by the slotted disc.

In the illustration of the diagram Figure 3, the output from the triode tube V is directed through a step-up transformer 6 and the stepped up A.-C. voltage 5 C. P. S. is fed into a suitable voltage doubling circuit which may be of conventional design, as indicated by the numeral 7. The main or 10 C. P. S. ripple frequency from the double diode circuit is fed through a condenser 8 to a second and similar voltage double and rectifier circuit 9, producing a 20 C. P. S. ripple frequency.

In the coupling of the voltage doubler the condenser 8 is introduced to block the D.-C. component and the second tube then doubles the ripple frequency so that the current produced will be qualified as of twenty cycles per second. This current is amplified by the tube 10.

The resultant current is then transformed through the transformer 11 to operate the slotted disc Z or to flash a light to periodically illuminate the constantly rotating marked disc J.

In the diagram Figure 4 the output from the tube V is directed through the transformer 12 which has a tuned secondary providing current to the bridge rectifier 13. The results from the rectifier 13, which contains a ripple voltage of 10 C. P. S., passes through a transformer 14 to a second rectifier bridge comprising diodes 15, and this ripple voltage of 20 C. P. S. is directed through transformer 16 to a Strobotron tube 17, which thus produces in an illuminating lamp, flashes in the order of twelve hundred per minute.

Other methods of producing flashes in the order of the number of ticks per minute of a watch, or any multiple of same may be utilized without departing from the essential features of this invention.

A device such as described is extremely simple. It utilizes very well known principles of electronics and light, and an apparatus such as described is found in practice to be extremely accurate and may be manufactured at such a cost as to enable its universal use by those desiring the necessary equipment to properly time watches.

It will be understood that an instrument such as described may be modified in many respects and further, it will be appreciated that the impulses of a "Standard" watch may be readily utilized to operate a stroboscope to function in the timing or comparison of movement of any rotating element.

What I claim as my invention is:

1. A means for testing watches comprising a microphone adapted to transform the sound waves produced by the tick of one watch into electrical impulses, means for amplifying the electrical impulses of the microphone, a rotatable disc having circumferentially spaced markings thereon, reciprocal means actuated by the amplified electrical impulses forming a direct drive driving said disc at a speed corresponding to the frequency of the ticks of said watch, a light source positioned to direct light towards the marked face of said disc, a second microphone adapted to transform the sound waves produced by the tick of a second watch to be compared with the aforesaid watch into electrical impulses, means for amplifying said latter electrical impulses, and means actuated by said amplified impulses of the second microphone and controlling the illumination of said disc by said light source for producing regular periodic light flashes to illuminate the marked surface of said disc, said latter means comprising a pair of opposed magnets, an armature mounted to reciprocate between said magnets, electric contact means carried by said armature for switching the current flow through one of the magnets of said pair to flow through the opposed magnet once each tick of a watch giving rise to said latter amplified electrical impulses to reciprocate said armature, and means connected with said armature for rotating said disc each reciprocation.

2. A means for testing watches comprising a microphone adapted to transform the sound waves produced by the tick of one watch into electrical impulses, means for amplifying the electrical impulses of the microphone, an electronic tube having its grid receiving the amplified electric impulses and controlling the flow of amplified current periodically, an electromagnet connected with the output of said electronic tube, an armature pivotally mounted and actuated by said periodically energized magnet, a rotatable disc arranged adjacent said magnet, means connected with said armature forming the sole means for rotating said disc at a speed corresponding to the ticks of said watch, a light source positioned to direct light towards said disc, said disc having a marked face to receive light from said source, and means actuatable by the sound waves produced by the ticks of a second watch to be compared with the aforesaid watch and controlling the illumination of said disc by said light source to produce regular periodic light flashes to illuminate the marked face of said disc.

3. A means for testing watches comprising a microphone adapted to transform the sound waves produced by the tick of one watch into electrical impulses, means for amplifying the electrical impulses of the microphone, a rotatable disc having circumferentially spaced markings thereon, means actuated by the amplified electrical impulses for effecting the rotation of said disc at a speed corresponding to the frequency of the ticks of said watch, a second microphone adapted to transform the sound waves produced by the tick of a second watch to be compared with the aforesaid watch into electrical impulses, means for amplifying said latter electrical impulses, a magnet actuated by said amplified impulses of the second microphone, an armature operated by said magnet, a disc rotatably mounted and operatively connected with said armature and having regularly spaced orifices adapted to periodically direct a beam of light to illuminate the first disc, and a light directing beams of light through the orifices of said second disc.

HERALD B. GREENING.

References Cited in the file of this patent

UNITED STATES PATENTS

| Number | Name | Date |
|---|---|---|
| 1,769,988 | Davis | July 8, 1930 |
| 1,976,850 | Horton | Oct. 16, 1934 |
| 2,092,039 | Young | Sept. 7, 1937 |
| 2,166,833 | Wilfart | July 18, 1939 |
| 2,303,540 | Gibbs | Dec. 1, 1942 |
| 2,308,202 | Norrman | Jan. 12, 1943 |
| 2,398,761 | Aiken | Apr. 23, 1946 |
| 2,425,613 | Gibbs | Aug. 12, 1947 |